April 8, 1924.
G. E. LUCE
1,490,076
PALLET CAR LOADING AND UNLOADING
Filed Dec. 15, 1920    4 Sheets-Sheet 4
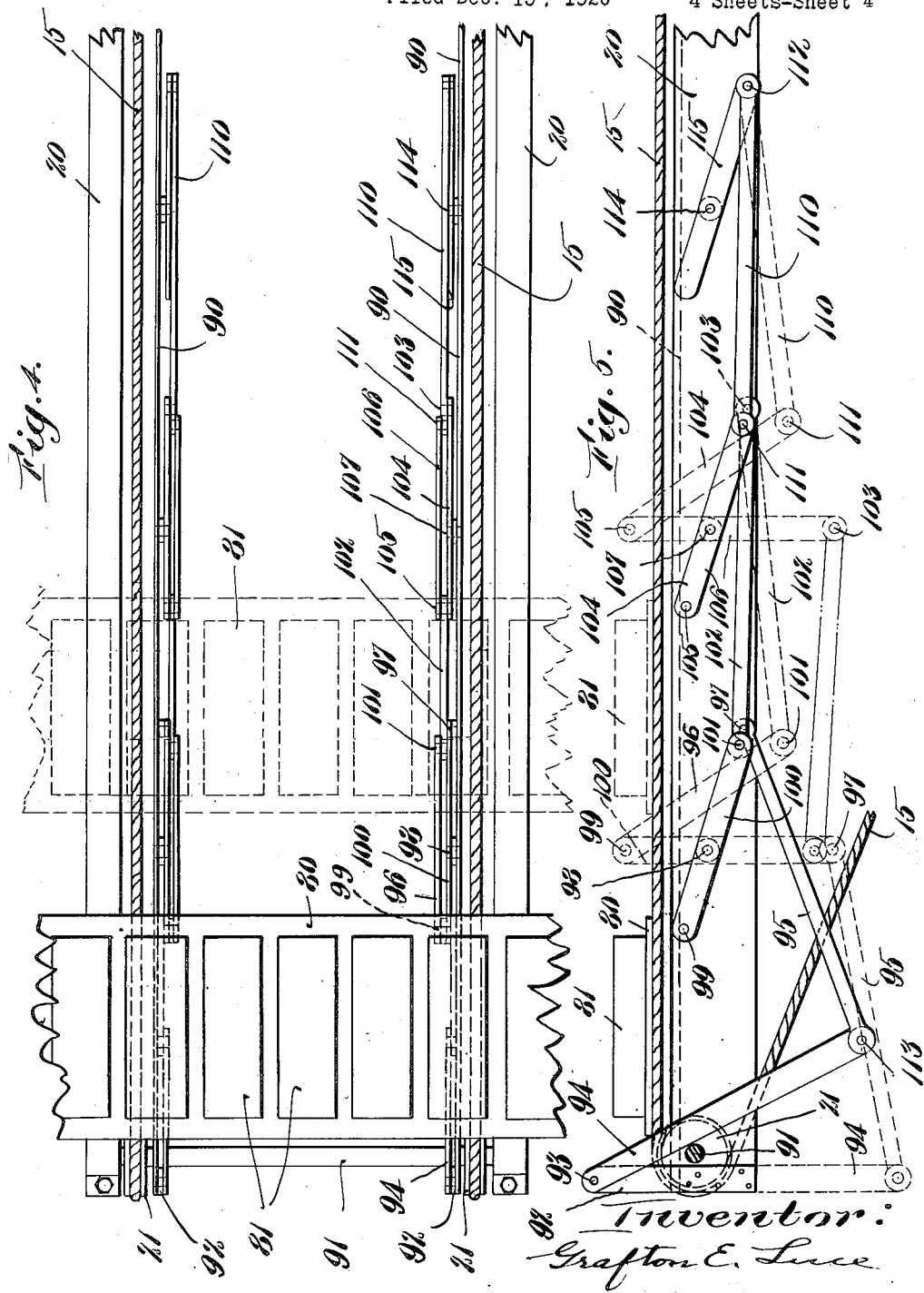

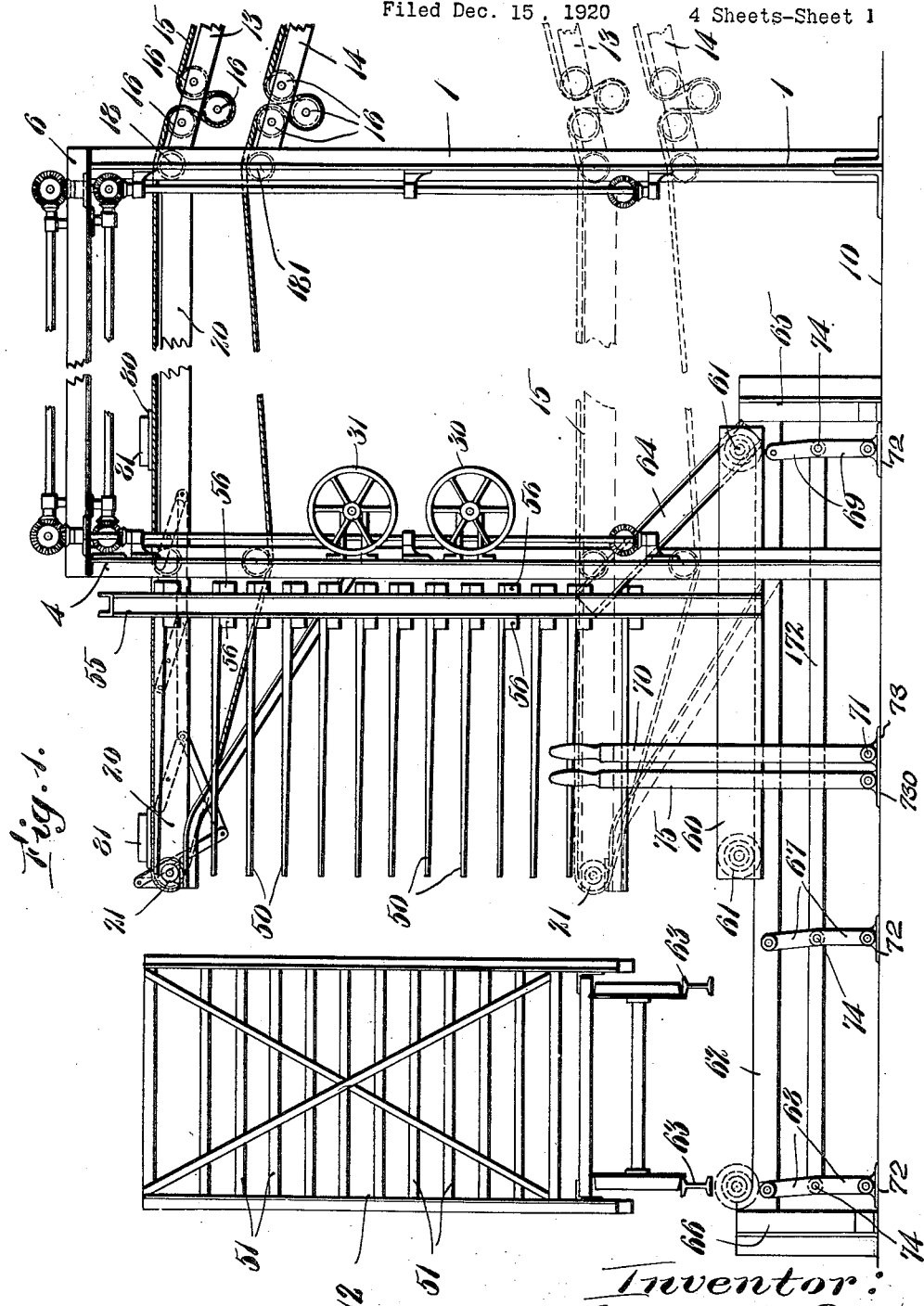

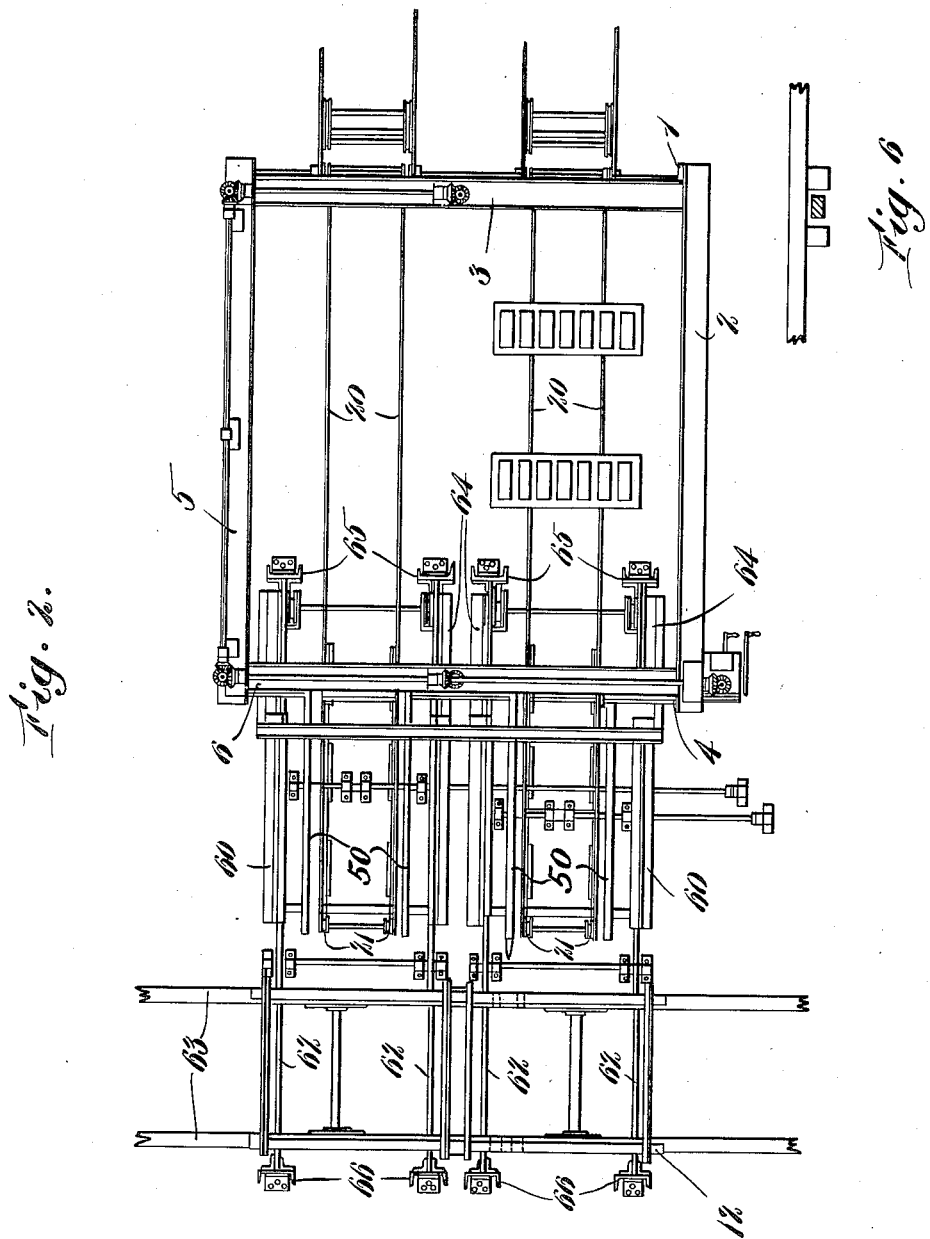

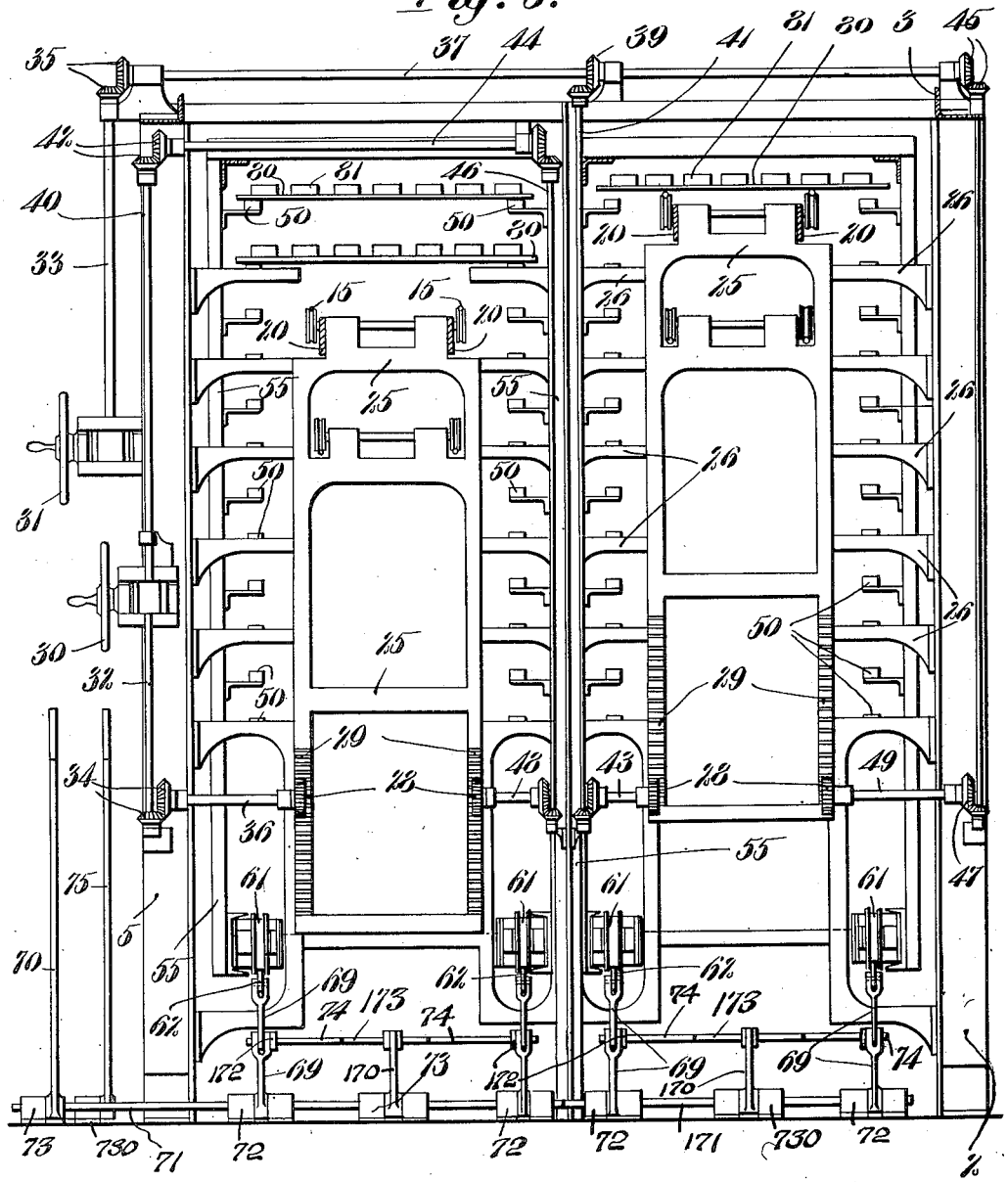

Patented Apr. 8, 1924.

1,490,076

UNITED STATES PATENT OFFICE.

GRAFTON E. LUCE, OF CHICAGO, ILLINOIS.

PALLET-CAR LOADING AND UNLOADING.

Application filed December 15, 1920. Serial No. 430,837.

*To all whom it may concern:*

Be it known that I, GRAFTON E. LUCE, a citizen of the United States, and resident of Chicago, in the county of Cook and State of Illinois, have invented an Improvement in Pallet-Car Loading and Unloading, of which the following description, in connection with the accompanying drawings, is a specification, like characters on the drawings representing like parts.

In my development of improvements and apparatus for use in making the manufacture of molded brick an automatic and continuous process, as explained in my prior and copending application, Ser. No. 319,707, filed Aug. 25, 1919, I have disclosed therein two different methods of handling the brick. One of these methods requires the use of drier cars, wherein the pallets of green brick are transferred to a rack car and this car then carries the brick through the drying operation. Thereafter the brick are to be unloaded from the cars and conveyed to the kiln, or the automatic hacking apparatus for the subsequent automatic setting by a mechanical setter.

It is an object of the present invention to render this step of loading and unloading the drier cars operative by automatic mechanism, and as a continuous process. While the present invention has other fields of usefulness, it is primarily intended for use in the manufacture of molded brick and for the purpose of carrying out my novel process from molding machine to kiln, as explained in said prior application, wherein one of the alternative methods of handling brick to, through and out of the drier, utilizing a drier car, is practised. This present apparatus, therefore, enables the manufacture of brick with a rack drier car to be carried out as continuously and as automatically, as in the process wherein the brick are carried into a special form of pipe rack drier by the conveying mechanism, and unloaded therefrom after drying, which drier, process and devices are explained in my copending application, Ser. No. 259,770, filed Oct. 26, 1918.

In devising mechanism to render automatic the operations of handling pallets of brick as they are received continuously from the travelling conveyor, which may be and preferably does, transport the pallets of loaded brick directly from the molding machine to the drier cars, I provide mechanism which will automatically handle and load each of the shelves of the drier car simultaneously; mechanism which will effect the automatic spacing of the pallets, for the loading in the drier car to insure a maximum of drying efficiency; means to carry the pallets of brick onto a loading device and to transfer said pallets from the loading device to the drier car by a relatively slight, vertical movement, whereby the brick are maintained in spaced position on the pallet, are undisturbed and all danger of marring the green brick is eliminated. Furthermore, my automatic loading mechanism constitutes either a loading station or an unloading station, or a duplicate apparatus can be utilized for unloading drier cars after they have come from the drier, taking the pallets of brick directly therefrom and conveying the brick on a travelling conveyor to and through automatic pallet and brick separating mechanism for subsequent handling, in a hacking machine.

In my present invention I establish a loading or unloading station to which station, when used as a loading apparatus, the pallets of brick are carried by a continuously travelling conveyor, the conveyor itself being capable of being raised and lowered at various levels for the purpose of loading successively the fingers, which latter correspond to the racks on the drier car. As each shelf of these loading fingers receives its quota of brick pallets, the pallets are automatically alined and spaced. When the entire series of fingers of the loading apparatus are filled with the pallets of brick, I then provide means to effect a relative movement between the loading fingers and the drying car, which latter has been positioned adjacent the fingers for the loading operation, projecting the loaded fingers into and slightly spaced above the corresponding shelves of the drier car, thereupon effecting a relatively vertical movement between the loading fingers and the shelves of the drier car, whereby the pallets are all unloaded upon the drier car, and thence removing the loading fingers thus freed of their load of pallets, returning the same in position for successive load receiving action from the continuously travelling conveyor. I also provide means which will automatically aline the drier car and the loading apparatus during the operation just explained, so as to steady the moving parts and insure the correct positioning and alinement of the loading fingers and car.

As a drier car is usually approximately seven feet in length and the pallets are usually thirty-four inches, I have devised and herein shown a loading and unloading station sufficient to load the entire shelves of the drier car at one operation, although the same may be actuated for independent movement as will be more fully explained hereafter.

The drier car with its load of green brick on the pallets, having been moved to the drier, preferably such a drier as shown in my copending application, Ser. No. 373,399, filed April 13, 1920, is allowed to stand until the brick are dried. They are then moved outwardly either to the unloading apparatus, in which case the receiving belt would be reversed in direction, or to a duplicate unloading station where a similar apparatus is employed to lift the pallets of dried brick from the shelves of the drier car. The brick pallets are then transferred to a conveyor and started on their way to the brick and pallet separating station, automatic hacking machine, and mechanical bricksetter for building into a kiln.

Further features, important advantages, and details of construction will be more fully pointed out and claimed hereafter.

Referring to the drawings illustrating a preferred embodiment of the invention,

Fig. 1 is a side view of my loading and unloading apparatus, illustrating a drier car in end view in position for cooperation therewith;

Fig. 2 is a plan view of the apparatus and car as shown in Fig. 1;

Fig. 3 is an enlarged end view, viewing the same from the left of Fig. 1, and showing the duplex loading or unloading station;

Fig. 4 is an enlarged plan view of the conveyor and apparatus at the automatic spacing station; and Fig. 5 is a side view showing the automatic pallet alining and spacing mechanism.

Referring to the drawings, I provide a stationary framework, here illustrated of sufficient width to operate a pair of conveyors and duplicate loading fingers. This framework is indicated at 1, 2, 3, 4, 5 and 6, consisting in a rigid set of angle irons and arranged substantially as a quadrangle, resting on the ground line or support 10. This framework is of sufficient height for operation with the height of rack drier cars 12 employed. I have illustrated a twelve rack car, although it will be appreciated that any suitable or desired height and size is within the scope of my invention. On the framework 1 to 6 I secure raising and lowering devices to raise and lower the carrier for the conveyor. This conveyor or conveyors, is preferably a double rope type, leading from a gravity conveyor or other travelling carrier of ordinary type. From such receiving conveyor (not shown) I provide means to elevate or depress the conveyor herein illustrated, leading the same from a pivotal point adjacent the receiving conveyor in the manner similar to and identical with that illustrated in my copending application, Ser. No. 456,278, filed March 28, 1921, showing my novel form of drier and the method of loading the pallets into the drier directly from the conveyor, lowering the latter as the shelves are successively filled, and raising the height of the same when unloaded.

In Fig. 1 and 2, I have shown a fragment only of the upper end of the pivoted arms 13 and 14, on which the rope conveyor 15 is supported in raised and lowered position, these arms adjacent the carrier being provided with a plurality of pulleys 16, 16, 16, around which the rope 15 is wound and tightened. The ends of the arms 13 are pivoted at 18 to the horizontal plates 20, the latter extending clear across the framework and over the loading fingers, affording a carrier for the rope conveyors 15 to the extreme outer pulleys 21. These plates 20 are preferably formed as a light framework, and adapted to be raised and lowered throughout the height of the permanent framework 1 to 6, each being attached to a sliding crosshead 25. The ends of the arms 14 are pivoted at 181 to the crosshead 25. These crossheads are arranged for each conveyor, and at the right and left limits of the fixed framework 1 to 6, being adapted to slide vertically in contact with a plurality of brackets 26, projecting at each side of the frame, see Fig. 3. In order to raise and lower these cross-heads, a pair of pinions 28 are supplied, adapted to mesh with racks 29, formed in the adjacent faces of the crosshead and operated from hand wheels 30 and 31, through the rods and gears 32, 34, 36, 38, 40, 42, 44, 46 and 48 from the wheel 30; and 33, 35, 37, 39, 41, 43, 45, 47 and 49 from the wheel 31. This construction enables the operator to stand adjacent the wheels 30 and 31 and operate them independently or simultaneously to raise and lower the respective cross heads 25, during either the loading operation or the unloading.

As above noted, the conveyor 15 extends clear around the uppermost pulley or sheave 21 in order to carry the pallets throughout the length afforded by the loading fingers, these fingers 50 being the same number and substantially the same spacing as that of the racks or shelves 51 on the drier car 12. These fingers 50 are preferably arranged for vertical movement, and to this end I mount the same on a vertically moving support 55, securing these fingers to cross braces 56, whereby ample rigidity is afforded for the frame 55 to carry the fingers and their load of pallets and brick. This frame 55 is secured to a carriage 60 having a plurality of wheels, here shown as four in number, 61, 61, adapted to traverse a track 62 extending under the track 63 on which the drier car 12 is moved, and allowed to stand in position. Braces 64 aid in holding the frames 55 and carriage 60 in rigid position.

In order to have the entire frame work and fingers, as well as the carriage 60, movable vertically to effect the loading and unloading action between the fingers 50 and racks 51, 51, I mount the tracks 62 in a vertical slide, these slides 65 and 66 being spaced sufficiently for the line of travel of the carriage 60 and to constitute stops therefor, as well as to raise and lower the same. Any suitable device can be utilized for raising and lowering these tracks, but as herein shown I employ a set of toggle links 67, 68 and 69 at each side of each track, and for each loading apparatus, it being understood that these loading fingers, carriage therefor and raising and lowering tracks are duplex. A lever 70 is secured at its lower end to a shaft 71, which shaft extends transversely of the apparatus and is rotatably mounted in bearing blocks 73, and the sets of toggle links 67, 68, and 69 at each side of each track, and for each loading apparatus, are pivotally mounted at their lower ends in bearing blocks 72, and at their upper ends to the tracks 62, while they are pivotally attached to a flat rod 172, by means of a plurality of parallelly arranged rods or shafts 74. Connected to the left hand pair of flat rods 172, as viewed in Fig. 3, and vertically above the shaft 71, is a shaft, or rod, 173 to which is pivotally attached the upper end of a link 170, the lower end of this link being secured to the shaft 71. Manipulation of the operating lever 70, therefore, operates the toggle links 67, 68 and 69 to raise and lower the left hand tracks 62, as viewed in Fig. 3. A lever 75, attached to one end of a shaft 171, which shaft extends transversely of the apparatus and is rotatably mounted in bearing blocks 730, is utilized to raise and lower the right hand tracks 62. The remainder of the apparatus for raising and lowering the right hand track 62 is similar to that just described above with respect to the left hand tracks.

As the pallets of brick 80 with the brick thereon, 81, are brought by the conveyor ropes 15 to the loading station, the horizontal line of travel of the ropes over the plates 20 from one side of the framework to the other, affords a collecting station to hold the pallets thus accumulated during the unloading of the fingers after the latter have been moved to load the drier car. Therefore the loading of the fingers 50 may be commenced with a plurality of pallets of brick already on the carrier 20 and ready to be conveyed directly to loading position 70 on the fingers 50. I provide a stop and preferably an automatic stop to hold these pallets of brick and accumulate the same during the car loading action, which latter only requires the forward and back movement of the carriage 60 and the lowering of the same. It is necessary to load the top rack first, and therefore the cross-heads 25 are raised to uppermost position, and the pallets of brick loaded on the topmost finger 50, then the cross-head is lowered and the next finger 50 is filled and this lowering and filling process is continued until all the fingers 50 of the apparatus are loaded with their desired number of pallets of brick. This loading action is accomplished because the pallets 80 are of sufficient length to span the fingers 50, see Fig. 3, and the lowering of the cross heads and conveyor 15 serves to rest the pallet directly upon the fingers, and at the same time to position the carrier so as to load the succeeding and next lower fingers. A similar movement is employed to transfer the loaded pallets from the fingers 50 onto the shelves 51 of the drier car by the relative vertical movement of the same, preferably lowering the fingers and resting the pallets directly upon the shelves of the car.

I prefer also to space these pallets and to straighten and realine them on the fingers 50, as the pallets of brick are received from the conveyor, when the fingers are being loaded. This feature is of importance as it is desirable that the pallets on the drier car be uniformly spaced for subsequent drying and to permit proper circulation of air to absorb the moisture from the green brick. To this end I attach to the carrier plates 20 at each side, an automatic spacing device, which constitutes a stop for the pallet, holding the same against further movement on the rope conveyors 15, while the latter slide thereunder, and providing devices which will enable the first pallet to be carried to the outermost position of the fingers, then to actuate the alining and spacing device for the next pallet, which will be carried to its position, and the next pallet will next actuate my automatic devices for stopping, alining and spacing of the succeeding pallet, and so on throughout the length of the fingers 50 and the entire series of pallets to be carried thereby. This automatic spacing device is illustrated in Figs. 4 and 5. I prefer to apply the automatic spacing members inside the width of the rope conveyors 15 and spaced slightly therefrom so that a pair of pallet engaging and spacing or stopping members will act on each side of the pallets. A pair of light frame members 90, 90, spaced from and parallel with the horizontal frame plates 20, and either supported from the plates 20 or attached to the cross-bars 91, which constitute the axles for the conveyor pulleys 21, and being arranged just inside of the conveyor belts, afford a support for the spacing members. Attached to the outermost ends of the frame are rigid upright stop members 92. At the top of each of these stop members is pivoted at 93 a lever 94, which lever extends downwardly a considerable distance and at its lowermost end is pivotally secured at 113 to a rod 95. This rod extends to and is secured at 97 to one end of a pivoted lever 100, the latter adapted to swing on a pin 98 secured to the frame 90. This lever 100 has pivoted to its uppermost end at 99, an arm 96, being similar in function and operation to the lever 94. This arm in turn is pivoted at 101 to a rod 102 which latter is secured to a duplicate set of levers to those numbered 100 and 96 and just described, being levers 106 secured to 102 at 103, which in turn is pivoted at 105 to the member 104 mounted on the pivot 107 to the frame 90.

Duplicate sets of arms and levers can be operated and I have illustrated in Fig. 5 the normal position of these spacing devices and then in dotted line position the subsequent movement of the same. As herein shown provision for the spacing, stopping and alining of four pallets only is shown, but this arrangement can be duplicated indefinitely for a larger number, if desired. The arms and levers so far described will act to stop and space three pallets and to stop the fourth pallet a further lever 110, pivoted to the arm 104 at 111, is arranged, which in turn is secured at 112 to the final stop 115, the latter being pivoted at 114 to the frame 90.

The operation of this automatic spacing apparatus will now be described. The operator would ordinarily move one of the levers 102 or 110 to the right, which acts to fold downwardly the arms 96 to 115 inclusive and to move forwardly or in advance of the line of movement of the pallets 80 the first pivoted arm 94. A pallet of brick 80, therefore, being released from the accumulation in the horizontal part of the drier from the incoming part of the frame 1 is carried on the ropes 15 onwardly or to the left viewing said figure and over the loading fingers 50 until the pallet contacts with the pair of arms 94 which are then in slanting position as shown in full lines Fig. 5. The continued movement of the pallet and its brick swings the arm 94 on its pivot 93, moving the same to the left and until the pallet comes in contact with the fixed stops 92. The arm 94 has now assumed the dotted line position shown in Fig. 5 and in vertical alinement with the fixed stop 92. This movement of the arm 94 acts through the connecting bar 95 to move its lever 96 into the vertical position shown in dotted lines in Fig. 5. This movement of the arm 96 into vertical position also tends to swing upwardly the pivot point 99 supporting the next arm 100 and the connecting rod 102 secured to the arm 100, holds the same so that it will assume a position substantially parallel with the original inclination of the arm 94. Consequently the second pallet of brick coming into loading position will strike the now inclined arm 100 and move it until it is also into alinement with the vertical arm 96 and the pallet of brick then stops. Meanwhile this swinging of the arm 100 acts to set the next pair of levers 104 and 106, positioning the member 104 at an inclination to be acted on by the succeeding pallet and moving the arm 106 into vertical position to stop the pallet. The next or third pallet of brick acting on the inclined arm 104 sets the final stop arm 115 into vertical position, equally spacing all the pallets and holding them thus spaced until the conveyor ropes are lowered and the pallets are deposited upon the arms 50. The operator can then reset the spacing device or any automatic actuation can be provided as a spring, weight or fixed stop on the frame or the like and the pallets of brick are spaced, stopped and alined for the succeeding shelf of fingers 50 on the loading apparatus. The pallets are not only stopped in position, spaced in desired relation to each other automatically, but are also alined or trued up, the friction of the ropes 15 serving to settle the pallets against the vertical stops which are in right angled position to the conveyors and thus the pallets are straightened before being lowered onto the loading arms. By the length of the arms and shifting the pivots, a variable spacing can be attained, adjustable for the drying of any desired type of brick or drier, the circulation of heat and air in the drier depending upon the spacing of the pallets and some brick permitting less spacing than others. This automatic spacing apparatus I prefer to utilize in the loading device as herein shown and explained, but I have elected to claim this automatic spacing apparatus broadly in my copending application, Ser. No. 518,157, filed Nov. 28, 1921, this feature of my invention being applicable for many uses. The entire apparatus herein explained constitutes an important link in my development of handling brick to and from the molding machine to and into the kiln automatically when it is desired to employ cars. The brick are received continuously from the molding machine after they have passed from the mold and brick separating devices and are stood on edge for the hacking; they are then transported through the loading and unloading apparatus herein described, accumulating on the conveyor belts until allowed to extend outwardly over the loading fingers 50, wherein they are properly spaced as desired. The successive fingers of the loading apparatus are quickly filled and then the entire loading apparatus moves forward to load a car, is itself unloaded by a relative vertical movement between the car and the fingers 50 and retracted for repeated loading. Preferably two cars are loaded simultaneously and are then moved out of the way while the loading fingers 50 are being filled with the pallets of brick and two new cars are positioned in alinement therewith and the automatic operation is repeated as long as the brick machine is operated. An important advantage of my invention is that the brick machine can be started and the brick almost immediately loaded onto the drier cars and the subsequent operations thereon continuously performed. Heretofore it has been customary and necessary to start the brick molding machine many hours in advance of the work of loading the cars in order to get enough brick ahead for the car loading and hacking operation, as well as to move the green brick and pallets away from the molding machine, have enough molded brick on pallets, etc., to start loading the cars. Thus if the brick machine was started at five a. m., the car loading operation would not be ready until eight a. m., under prior conditions. By my invention the entire brick-yard operations can be started practically simultaneously and the brick machine does not have to be run hours in advance of the regular succeeding work.

My invention is further described and defined in the form of claims as follows:

1. Apparatus of the kind described, for loading rack drier cars, comprising an endless continuously operable conveyor, means to receive pallets of brick therefrom, and means to transfer said pallets of brick from the said means to the car by a relative vertical movement between said means and said drier car.

2. Apparatus of the kind described, comprising a receiving conveyor, on which pallets of brick are moved continuously, a collecting space on which pallets of brick may be accumulated, a rack car having a plurality of shelves on which pallets of brick are to be loaded, and a loading apparatus, adapted to receive pallets of brick from said accumulating space and to transfer the pallets onto the racks of said car.

3. Apparatus of the kind described, comprising a receiving conveyor, on which pallets of brick are moved continuously, a collecting space on which pallets of brick may be accumulated, a rack car having a plurality of shelves on which pallets of brick are to be loaded, and a loading apparatus having a plurality of pallet carrying arms, means to effect a relative movement between the pallet conveyor and the loading arms to transfer pallets from the conveyor to the said loading arms, and mechanism to move the loading arms into a car loading position and means to thereafter effect a relative vertical movement between the car and loading arms to unload pallets of brick from said arms onto the racks of said car.

4. Apparatus of the kind described, comprising a plurality of brick pallet carrying devices, adapted to convey pallets of brick continuously at varying heights, a plurality of rack drier cars, in combination with means to load pallets of brick from said carrying devices to said plurality of cars simultaneously.

5. Apparatus of the kind described, comprising a conveyor, adapted to transfer pallets of brick continuously, a loading frame, said conveyor extending into the loading frame, means automatically operated by the travel of the brick pallets to space the same on the conveyor at its line of travel adjacent the loading frame and means to lower the conveyor whereby the pallets of brick are automatically transferred in spaced relation from the conveyor to the loading apparatus.

6. Apparatus of the kind described, comprising a conveyor, adapted to transfer pallets of brick continuously, a loading frame, said conveyor extending into the loading frame, means automatically operated by the travel of the brick pallets to space the same on the conveyor at its line of travel adjacent the loading frame and means to lower the conveyor whereby the pallets of brick are automatically transferred in spaced relation from the conveyor to the loading frame, in combination with mechanism adapted to move the entire loading frame into overlapping position with the racks of a drier car and to thereafter lower the loading frame, whereby the pallets of brick are transferred from the loading frame to the racks of the drier car.

In testimony whereof, I have signed my name to this specification.

GRAFTON E. LUCE.